United States Patent Office 3,726,807
Patented Apr. 10, 1973

3,726,807
TERNARY EMULSIFYING AGENT
Keith L. Johnson, Matteson, and Harry T. Anderson, Clarendon Hills, Ill., assignors to Swift & Company, Chicago, Ill.
No Drawing. Original application Apr. 26, 1968, Ser. No. 724,613. Divided and this application Nov. 13, 1970, Ser. No. 89,454
Int. Cl. B01f 17/22, 17/34
U.S. Cl. 252—356
3 Claims

ABSTRACT OF THE DISCLOSURE

A ternary emulsifying agent capable of forming optically transparent unified oil and water emulsions is disclosed, said ternary emulsifying agent comprising (1) a condensate of a fatty acylating substance having an average of 12-22 carbons in the acyl group and an alkylolamine having at least one acylatable hydrogen in the amino group, (2) a polyoxyethylene derivative represented by one of the following formulas:

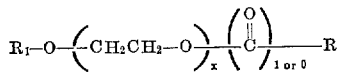

or

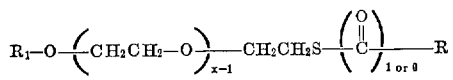

wherein $x$ is an integer of 8-60, $R_1$ is H, methyl, ethyl, propyl or butyl, R is a saturated or unsaturated fatty alkyl group having between 12 and 30 carbons or an alkyl phenol having 1-3 alkyl groups containing 3-12 carbons per group, and (3) a lower alkyl or aryl ether of a glycol selected from the group consisting of ethylene glycol, diethylene glycol, triethylene glycol, propylene glycol and dipropylene glycol.

---

This application is a division of copending application Ser. No. 724,613 filed Apr. 26, 1968 and now U.S. Pat. No. 3,565,678.

This invention is directed to compositions useful in the treatment of metal surfaces. More particularly, the invention relates to the protection of ferrous metals during storage. In addition, the invention concerns a method of protecting the finish of metal strip, sheet or plate, including coated or plated metal, against scratching and oxidative deterioration which comprises applying emulsified oil compositions to the surface of metal and forming a film of oil thereon.

Generally speaking, stainless steel is that steel which contains an element such as nickel and/or chromium and does not readily tarnish on exposure to the atmosphere. However, the major production of steel strip or steel sheet is of the mild or nonstainless variety and the rusting and/or corrosion of the non-stainless steels during storage in the mills and warehouses is a considerable problem. This oxidative deterioration has been partially alleviated by controlling the humidity and chemical content of the air coming in contact with the stored product. In addition to controlling the environment, mineral oil and mineral oil solutions containing various corrosion inhibitors have been utilized for the prevention of oxidation during storage.

However, complete and accurate control of the environment is not only expensive, but is impractical as well. Further, in regard to the oil layer present on the metallic surface, it must not interfere with any subsequent coating application such as plating, lacquering or lithographing. In those cases where the oils used do interfere in additional procesing steps, it is required that the oil be substantially removed at some time prior to further processing the metal. This removal of the oil film is difficult and generally requires scrubbing with alkaline cleaning agents or vapor phase degreasing.

In addition to difficulties in removing the oil, mineral oil (and other oils) treatments are not wholly satisfactory from a performance standpoint in eliminating oxidation and other corrosion inasmuch as the oil frequently "pinholes" when exposed to high atmospheric moisture levels resulting in a product housing localized rusting or corrosion. By "pinholding" is meant the fact that there is incomplete coverage of the metal surface or coverage of such a thin nature at various spots on the metal that the surface is exposed to the atmosphere.

Therefore, it can be readily seen that a method for protecting ferrous metals mithout incurring operational and economic difficulties heretofore experienced would be highly desirable in the art.

It is therefore an object of this invention to provide a means for preventing substantial oxidative deterioration to metal surfaces.

Another object of the invention is to provide a novel composition which when coated upon ferrous surfaces will protect them against extremely high humidity levels and extreme cycles of temperature and humidity.

Still another object of the invention is to provide a composition capable of protecting ferrous surfaces, yet is capable of being readily removed by contact with water.

Aonther object of the invention is the formation of an emulsifying agent which is capable of producing optically transparent unified emulsions.

Additional objects, if not specifically set forth herein, will be readily apparent to those skilled in the art from the detailed description of the invention which follows.

In general, it has been found that an optically transparent unified emulsion of water and oil can be prepared which, when incorporated with appropriate corrosion inhibitors and applied to metallic surfaces, will provide storage protection against extremely high humidity levels and extreme cycles of temperature and humidity. It is believed that the moisture content of this emulsion varies in such a manner so as to attain an equilibrium with the relative humidity of the atmosphere. This "breathing" of the film explains the lack of pinholing even when relatively great extremes of temperature and humidity are experienced by the metal in storage. A further advantage of the emulsions of this invention is that the materials are readily removable by the application of water; requiring no alkaline cleaning or vapor phase degreasing prior to most uses.

More specifically, the novel emulsifying agent of this invention comprises a ternary mixture of a condensation product of an alkylolamine having at least one acylatable hydrogen atom in the amino group and a fatty acylating substance having between about 12 and about 20 carbons in the fatty acyl group, a polyoxyethylene derivative wherein the polyoxyethylene portion has a molecular weight of between about 300 and about 2,000, and an ether of a low molecular weight alkylene glycol. The condensation product contains a predominant amount of amide which acts as the oil-solubilizing agent in the unified emulsion. The polyoxyethylene derivative, among other things, imparts a tolerance for water to the amide while the glycol gives increased tolerance for water and further acts as a viscosity stabilizer.

The ternary emulsifying agent has the ability to emulsify 20:80 to 8:20 mixtures of water and oil and has the further property of being effective when used in amounts such that the total weight of the oil and water exceeds the total weight of the emulsifier. Generally speaking, if an emulsified system is not transparent, it indicates that at least two phases are present which will eventually separate. In order to produce the unified emulsions (optically transparent) it has been required in the past that the emulsifying agent comprise at least 50%, by weight, of the emulsified system in order to prevent phase separation. Therefore, it was quite unexpected to find that the ternary emulsifier of this invention can be used in amounts as little as 20%, by weight, of the total emulsified system. Of course, larger amounts are effective and, generally, the amount of the emulsifying agent will range between about 20% and 50%, preferably between about 30% and 40%, by weight, of the total emulsified system.

More in detail as to the description of the various components, the condensation product may be further defined as comprising essentially fatty acid amides of the alkylolamine combined with a non-performance-affecting amount of fatty acid monoester of the alkylolamine as well as small amounts of free amine and glycerine if the acylating agent utilized is a glyceride. While it is not a preferred component of the system, the percentage of the ester, based on the weight of the condensate, can vary from about 10% to about 40% without substantially affecting the emulsifying performance. In general, the condensate when first formed will have an amide:ester ratio of about 7:3, but after aging will end up with a low ester content. This low ester content of the condensate can be defined as less than about 10%, based on the weight of the condensate.

In producing the amide, the acylating agent and alkylolamine, in ratios varying between about 1:2 to 2:1 are heated to a temperature of between about 140° C. and 200° C. for 1½ to 6 hours. In the working example set forth below, diethanolamine or diisopropanolamine will be set forth. However, monoalkanolamines such as monoethanolamine, or monopropanolamine may be used either alone or in mixtures with diethanolamine or diisopropanolamine to form the condensate. The alkylolamines useful in this invention contain about 1 to 4 carbons per alkyl radical and can be mixed alkylolamines such as ethyl isopropanolamine or mixtures of different alkylolamines. The acylating substance is preferably a monocarboxylic acid or derivative thereof having an average of about 12 to 22 carbon atoms in each acyl chain. By acylating substance, it is meant any substance which is capable of the formation or introduction of an acyl radical in or into the alkylolamine and includes carboxylic acids, carboxylic acid halides, carboxylic acid esters, and anhydrides. In regard to the esters, the term is meant to cover both esters of monohydric alcohols and esters of polyhydric alcohols such as the glycerol esters.

In forming the polyoxyethylene derivative, polyethylene glycol may be formed by the polymerization of ethylene oxide with ethylene glycol, and this followed by the acylating agent will produce the polyoxyethylene derivative. The polymer may be blocked at one end with a lower alkoxy group such as methoxy, ethoxy, propoxy or butoxy, etc. Of special importance are the polyethylene glycols having a molecular weight varying between about 200 and 2,000. Molecular weights of the preferred polyoxyethylenes will vary between 300 and 1,000. An alternative route in making the polyoxyethylene derivatives is the ethoxylation of an active hydrogen compound such as a fatty alcohol, fatty acid, alkyl mercaptan or alkyl phenols. The ethoxylated material may be represented as follows:

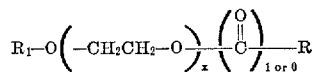

or

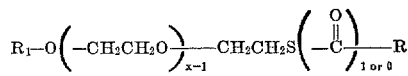

wherein $R_1$ is H, methyl, ethyl, propyl or butyl; R is saturated or unsaturated fatty alkyl group of between about 12 and 30 carbons, or an alkyl phenol having 1 to 3 alkyl groups containing 2 to 12 carbons per group; and $x$ will vary between about 8 and about 60. Particular fatty acids which may be ethoxylated include lauric, myristic, palmitic, stearic, arachidic, behenic, oleic, elucic, and linoleic acid, etc. A representative group of usable alcohols comprises the mercaptans, such as dodecyl mercaptan, octadecyl mercaptan, eicosyl mercaptan, docosyl mercaptan, octacosyl mercaptan, triacontyl mercaptan, etc., and the corresponding oxo alcohols. The alkyl phenols which may be ethoxylated may be described as phenols possessing 1 to 3 alkyl groups of 2 to 12 carbons per group. The specifically preferred alkyl phenols are mono- and di-nonyl phenol.

The third member of the ternary emulsifying agent consists of a lower alkyl or aryl ether of a glycol selected from the group consisting of ethylene glycol, diethylene glycol, triethylene glycol, propylene glycol, and dipropylene glycol. By lower alkyl, it is meant alkyl radicals of less than 8 carbons and preferably 4 or less, such as methyl, ethyl, propyl and butyl. The aryl portion of the ether may be described as phenol or substituted phenol containing 0 to 3 alkyl groups of 1 to 2 carbons per each alkyl group.

The ternary emulsifying agent comprises about 20% to 50% of the condensation product containing a predominant amount of amides, about 40% to 80% of the polyoxyethylene derivative and about 5% to 40% of the lower alkyl or aryl glycol ether. The condensate and polyoxyethylene derivative components may, if the fatty portion is to be the same, be prepared by esterification of essentially all the fatty acid in the composition followed by aminolysis of a portion of the fatty ester by an alkylolamine. This method, although generally preferred, is in no way limiting to the invention.

To form the unified, optically transparent emulsions of this invention, a mixture of water and hydrocarbon oil in the ratio of about 20:80 to 80:20 is combined, by means of agitation, with the ternary emulsifying agent in amount such that the emulsifying agent comprises about 20% to about 50%, by weight, of the total emulsified system. The hydrocarbon medium generally comprises refined mineral oil or fractions thereof. Refining may be by percolation, sulfuric acid treatment, extraction with selective solvents, propane precipitation, etc. Examples include petroleum naphtha cuts, mineral spirits, mineral seal oil, kerosene, gas oils, petroleum ether; aromatic hydrocarbons such as benzene, o-xylene, m-xylene, p-xylene, butylbenzene, cumene; paraffinic hydrocarbons, e.g., hexane dimethylpentane, octane, nonane, undecane, dodecane, and cycloparaffins.

Corrosion and rust inhibitors in amounts of 0% to 2%, by weight of the unified emulsion, which may be utilized are represented by inorganic materials, amines, chelating agents, sequestering agents, and combinations thereof. Examples include sodium meta silicate, diethanolamine, triethanolamine, higher fatty amines, sodium gluconate, sodium glucoheptonante, tetra sodium salt of ethylenediaminetetraacetic acid, diethanolammoniumethylorthophosphate, diethylammonium laurylphosphate, dimethanolamine and diethanolamine saturated with chromic sulphate, etc.

The unified emulsions of this invention can be applied to the metal surface by spraying, dipping, brushing, swabbing, trowelling, etc. The thickness of the oil-water film is not critical so long as a continuous film is deposited over the metal surface. Since the moisture content of the emulsion can vary between about 20:80 to 80:20, water to oil, the moisture content of the film can also vary depending upon the relative humidity of the atmosphere. For example, when the unified emulsion has a ratio of water to oil of 20:80, a considerable amount of moisture can be absorbed by the film without film failure. This "breathing" by the film explains the lack of pinholing even when relatively great extremes of temperature and humidity are experienced by the metal in storage.

In addition, the films of the unified emulsions are readily removable by the application of large amounts of water, i.e., flushing prior to most uses. In this connection, it is pointed out that no alkaline cleaning or vapor phase degreasing need be carried out in order to strip the film from the metal surface.

The following examples are set forth merely to illustrate the invention and are not to be taken as any limitation of the invention which is set forth in the claims appended hereto:

EXAMPLE I

Six hundred grams of polyethylene glycol having a molecular weight of about 600 was reacted with 400 grams of tall oil fatty acids in the presence of 2½ grams of toluene sulfonic acid under vacuum at a temperature of about 142° C. After a six hour-period, the unesterified fatty acid was determined by titration in alcohol to a thymolphthalein, end point to be 4.62%. Fifty-seven grams of di(2-hydroxyethyl)amine was added and the reaction mixture maintained at a temperature of 149° C. for an additional two hours. To this reaction product was added 300 grams of ethylene glycol monophenyl ether and 1,500 grams each of water and light lubricating oil. In addition, 25 grams of N(2-aminoethyl)piperazine was added as a corrosion inhibitor. A strip of steel sheet was coated with a thin layer of the unified emulsion, and it was observed that the film possessed excellent corrosion and rust inhibition in 100% humidity atmospheres and oscillating temperatures.

EXAMPLE II

Three hundred grams of a commercial ethoxylated nonyl phenol having the nonyl group in the para position and being ethoxylated to 67.5% ethylene oxide was blended with 150 grams of a condensate of 75 parts of red oil with 25 parts of diethylolamine. One hundred fifty grams of butyl Cellosolve was blended in, followed by 500 grams of mineral seal oil and 500 grams of water. Ten grams of aqueous sodium silicate was added to the above as a corrosion inhibitor and the resulting unified emulsion coated on various strips of steel. The strips were placed in a humidity cabinet wherein the temperature varied from 70° F. to 150° F. and the humidity ranged from 30% humidity to 100% humidity over a period of several days. The unified emulsion showed excellent rust inhibition qualities.

EXAMPLE III

Two hundred parts of dodecyl mercaptan ethoxylated to a level of about 60%, by weight, was blended with 130 parts of olive oil which had been heated in the presence of diisopropanolamine on a 2:1 weight basis for a five-hour period at 150° C. One hundred parts of diethylene glycol monopropyl ether, 270 parts of water and 270 parts of kerosene were then blended along with .5% sodium glucoheptonate as inhibitor, and the resulting unified emulsion was coated upon steel strips. Over various temperatures and humidity ranges, the film did not fail and the product remained uncorroded.

EXAMPLE IV

Three hundred grams of the methyl esters of corn oil fatty acids was reacted with 450 grams of methoxypolyethylene glycol having a molecular weight of about 550 in the presence of 0.40% sodium methylate at a temperature of about 135° C. under vacuum. Two and one-half hours later, 43 grams of diethylolamine was added followed by an additional two hours heating at roughly 135–140° C. Seven hundred grams of a light-duty lubricating oil and 700 grams of water were added and the resulting material afforded excellent corrosion and rust protection, especially when the steel sheets were stacked one on top of the other.

Obviously many modifications and variations of the invention as hereinbefore set forth may be made without departing from the spirit and scope thereof, and, therefore, only such limitations should be imposed as are indicated in the appended claims.

We claim:

1. As a composition of matter, a ternary emulsifying agent capable of forming optically transparent unified oil and water emulsions when utilized in an amount of about 20% to 50% by weight, based on the total emulsified system, which comprises about 20% to about 50%, by weight, of a condensate of a fatty acylating substance having an average of about 12 to about 22 carbons in the acyl group and an alkylolamine having at least one acylatable hydrogen atom in the amino group, about 40% to 80%, by weight, of a polyoxyethylene derivative represented by one of the following formulas:

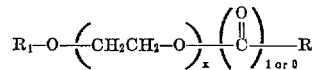

or

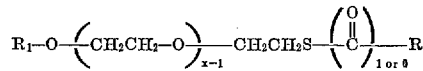

wherein $x$ is an integer of about 8 to about 60, $R_1$ is H, methyl, ethyl, propyl or butyl, R is a saturated or unsaturated fatty alkyl group having between about 12 and 30 carbons or an alkyl phenol having 1–3 alkyl groups containing about 3 to 12 carbons per group, and 5% to 40%, by weight, of a lower alkyl or aryl ether of a glycol selected from the group consisting of ethylene glycol, diethylene glycol, triethylene glycol, propylene glycol and dipropylene glycol.

2. The composition of claim 1 wherein the condensate comprises an amide of a member selected from the group consisting of diethanolamine and diisopropanolamine, and the acylating agent is selected from the group consisting of coconut oil, oleic acid and mixtures thereof.

3. The composition of claim 1 wherein the fatty acylating substance and the alkylolamine of said condensate are in ratios varying between about 1:2 to 2:1.

References Cited

UNITED STATES PATENTS 2,531,190  11/1950  Ackelsberg _____ 252—356
2,296,933  9/1942  Jordan _____ 252—356 X RICHARD D. LOVERING, Primary Examiner U.S. Cl. X.R.

106—14; 252—312, 357, 400, 401, 403, DIG. 1